(12) United States Patent
Wroblewski et al.

(10) Patent No.: US 8,586,116 B2
(45) Date of Patent: Nov. 19, 2013

(54) METHOD OF USING A BEVERAGE BREWER WITH SPRAY DISTRIBUTION ASSEMBLY

(75) Inventors: Leszek M. Wroblewski, Lake Forest, IL (US); Zbigniew G. Lassota, Long Grove, IL (US)

(73) Assignee: Food Equipment Technologies Company, Inc., Lake Zurich, IL (US)

( * ) Notice: Subject to any disclaimer, the term of this patent is extended or adjusted under 35 U.S.C. 154(b) by 698 days.

(21) Appl. No.: 12/399,595

(22) Filed: Mar. 6, 2009

(65) Prior Publication Data
US 2009/0226585 A1    Sep. 10, 2009

Related U.S. Application Data

(63) Continuation-in-part of application No. 10/849,387, filed on May 19, 2004, now Pat. No. 7,866,255.

(60) Provisional application No. 60/474,088, filed on May 28, 2003, provisional application No. 60/562,066, filed on Apr. 14, 2004.

(51) Int. Cl.
*A23F 5/00* (2006.01)
*A23F 3/16* (2006.01)

(52) U.S. Cl.
USPC .................................. 426/433; 426/435

(58) Field of Classification Search
USPC .............................. 426/433; 99/315
See application file for complete search history.

(56) References Cited

U.S. PATENT DOCUMENTS

| | | | | |
|---|---|---|---|---|
| 3,530,276 A | * | 9/1970 | Wells ........................... | 392/463 |
| 3,561,349 A | * | 2/1971 | Endo et al. ..................... | 99/307 |
| 3,570,390 A | * | 3/1971 | Jordan et al. ................... | 99/282 |
| 3,626,839 A | | 12/1971 | Martin et al. ................... | 99/315 |
| 3,859,902 A | | 1/1975 | Neumann et al. ............... | 99/304 |
| 3,935,805 A | * | 2/1976 | Ihlenfeld ......................... | 99/300 |
| 3,952,642 A | | 4/1976 | Vitous ............................. | 99/300 |
| 3,975,996 A | * | 8/1976 | Vitous ............................. | 99/295 |
| 5,111,740 A | * | 5/1992 | Klein .............................. | 99/295 |
| 5,477,775 A | * | 12/1995 | Delhom et al. ................. | 99/299 |

(Continued)

FOREIGN PATENT DOCUMENTS

| | | | |
|---|---|---|---|
| DE | 29608239 | * | 9/1996 |
| EP | 0804894 | * | 8/1993 |

(Continued)

*Primary Examiner* — Anthony Weier
(74) *Attorney, Agent, or Firm* — James W. Potthast; Potthast & Associates

(57) ABSTRACT

A hot beverage brewer (10) having a hot water dispense system (12), a brew basket assembly (18) for holding ingredient to be mixed with the hot water to make a freshly brewed hot beverage and a controller (16) for controlling the delivery of hot water from the hot water dispenser system to the brew basket (18) with a spray distribution assembly (14) having a spray head (20) having a generally vertical passageway (22) for receipt of hot water and an umbrella-like member (34). A spray plate (38) mounted beneath the umbrella-like member (34) has a downwardly, outwardly tapered top surface with radiating, outwardly, downwardly directed, upwardly facing grooves and an upwardly standing central core (58) snuggly received within the passageway (22) joined to the underside of the top of the umbrella-like member (34) with a plurality of vertical radially, outwardly facing grooves (68) extending from the top to the bottom to form a plurality of peripheral closed channels for passing hot water to upwardly facing grooves (74) of the umbrella-like body.

28 Claims, 11 Drawing Sheets

(56) References Cited

U.S. PATENT DOCUMENTS

| | | | |
|---|---|---|---|
| 5,906,844 A * | 5/1999 | Stahli et al. | 426/77 |
| 6,244,162 B1 | 6/2001 | Dahmen | 99/315 |
| 6,260,476 B1 * | 7/2001 | Pope | 99/323 |
| 6,658,989 B2 | 12/2003 | Sweeney et al. | 99/315 |
| 6,843,164 B2 * | 1/2005 | Drobeck | 99/280 |
| 7,669,519 B2 * | 3/2010 | Pope et al. | 99/315 |

FOREIGN PATENT DOCUMENTS

| | | | |
|---|---|---|---|
| FR | 2616646 | * | 12/1988 |
| FR | 2634365 | * | 1/1990 |
| GB | 1401691 | * | 7/1975 |
| JP | 1-160510 | * | 6/1989 |
| JP | 6-245863 | * | 9/1994 |
| JP | 2001-101516 | * | 4/2001 |
| JP | 2003-135279 | * | 5/2003 |

* cited by examiner

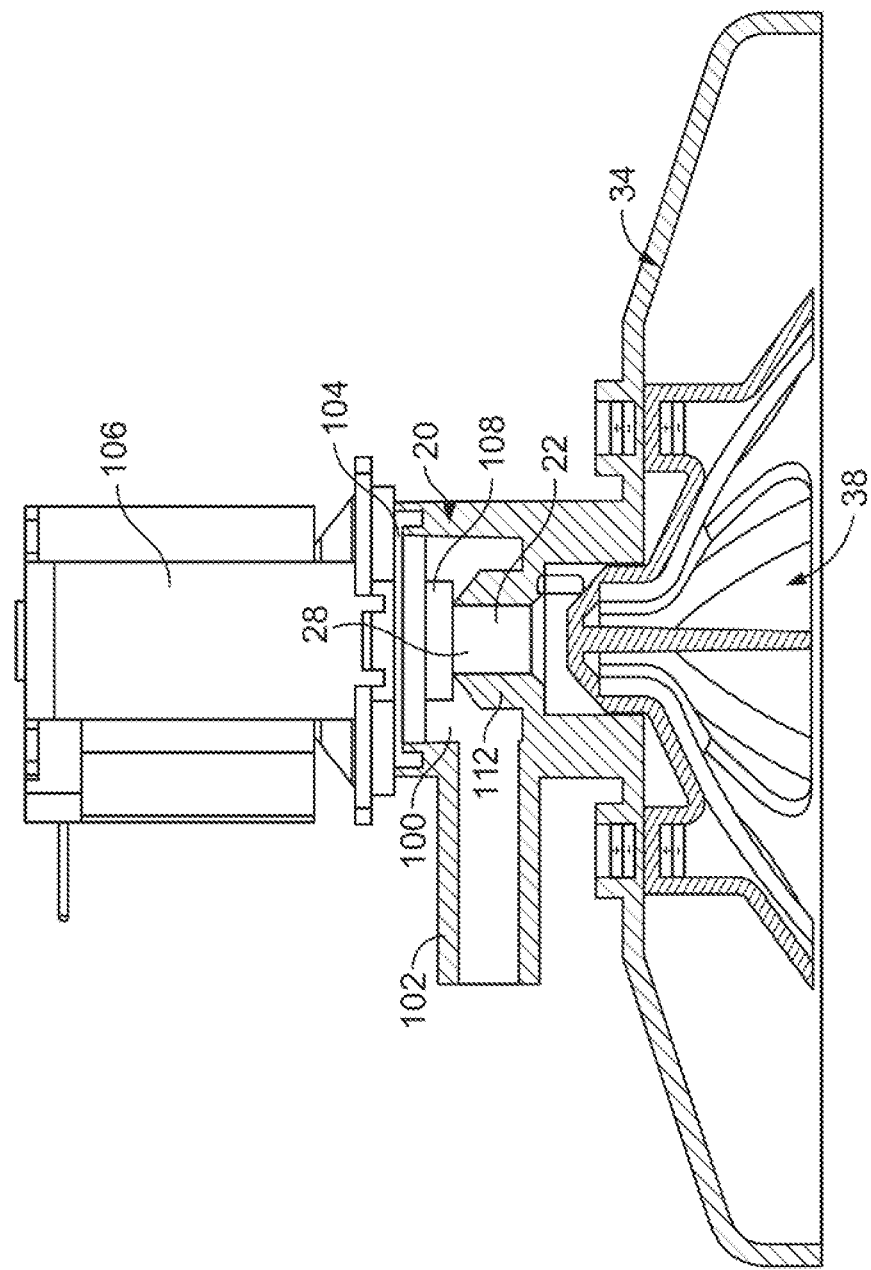

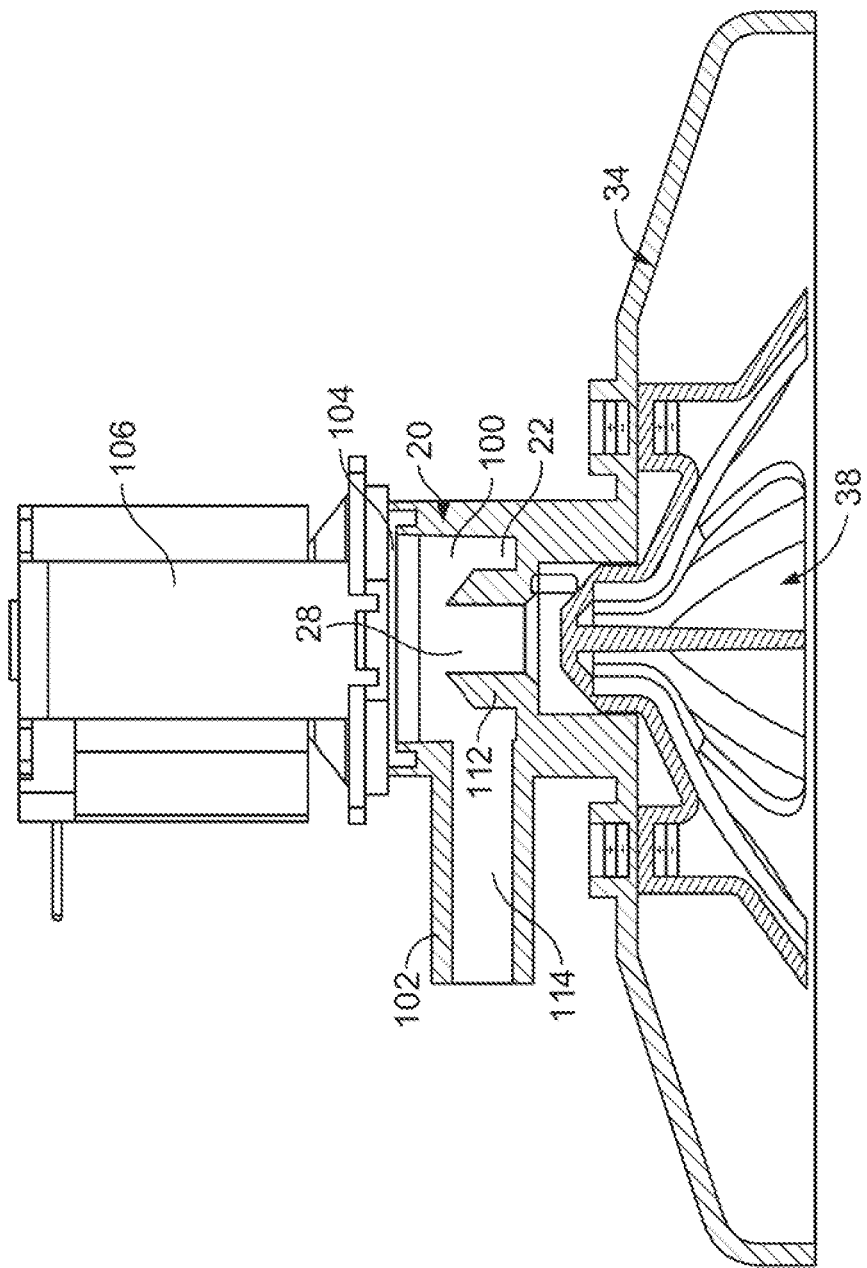

METHOD OF USING A BEVERAGE BREWER WITH SPRAY DISTRIBUTION ASSEMBLY

CROSS-REFERENCE TO RELATED APPLICATION

This application is a continuation-in-part of, and claims the benefit under 35 U.S.C. 120 of application Ser. No. 10/849,387, of the present co-inventors, filed May 19, 2004 and entitled "Beverage Brewer With Spray Distribution Assembly and Method", now U.S. Pat. No. 7,866,255, which is hereby incorporated by reference, and which, in turn, claims under 35 USC 119(e) the benefit of U.S. provisional applications Ser. No. 60/474,088, filed May 28, 2003, and Ser. No. 60/562,066, filed Apr. 14, 2004, both of which are hereby incorporated by reference.

BACKGROUND OF THE INVENTION

1. Field of the Invention

This invention generally relates to hot beverage brewers, such as hot coffee brewers and iced tea abstract brewers and hot tea brewers and, more particularly, to such brewers of the type that distribute hot water by means of a spray plate assembly upon ingredient contained within a brew basket to dissolve the ingredient to make the brewed beverage or brewed beverage abstract.

2. Discussion of the Prior Art

Coffee brewers and hot tea abstract brewers or hot tea brewers of the type that have a brew basket within which is contained the beverage ingredient such as ground coffee beans or tea leaves, through which hot water is passed are well know. Examples of such brewers are shown the following U.S. Pat. No. 5,000,082 issued Mar. 19, 1991 to Lassota for "Beverage Maker and Method of Making Beverage" and U.S. Pat. No. 6,148,717 issued Nov. 21, 2000 to Lassota for "Beverage Maker with Intermittent Beverage Liquid Dispenser and Apparatus and Method for Uniform Contact of Brew Ingredient with Brew", which are hereby incorporated by reference, and reference should be made to these patents and the patents cited therein for details of the construction and operation of such brewers.

Briefly, in most of such brewers the hot water is passed through a spray head in the form of a cup shaped container with a closed top for receipt of hot water from a hot water tank and a flat, circular bottom spray plate containing an array of spray holes. The spray plate in known brewers is made of stainless steel. The hot water passes through the array of spray holes to cumulatively create a hot water spray, or shower that falls on the top surface of an ingredient contained within the brew basket and then seeps through and partially dissolves the ingredient to form the freshly brewed beverage.

Due to the presence of lime, in various mineral forms and other minerals and mineral compounds, such as iron, dissolved in the hot water and the evaporation of the hot water in contact with the top and bottom surfaces of the spray plate and the inlets, outlets and side surfaces of the spray holes, calcium oxide, calcium sulfate, magnesium sulfate, calcium silicate and magnesium silicate and other mineral deposits build up on these surfaces and over time can clog entirely or partially obstruct the spray holes. Such residue build up is referred to as "liming".

Even if the spray holes are only partially obstructed, the time it takes for a given quantity of hot water to pass through the spray plate is increased as compared to when there is no obstruction. In some brewers, in which the total quantity of hot water is predetermined and simply drained or "dumped" through the spray head, the total quantity is not affected by the liming but the total length of time for dispensing the hot water is increased. In such case, the duration of the brew cycle is increased.

In other brewers, in which the selected quantity of hot water is measured by passing the water at a presumed uniform rate for a pre-selected dispense time period, the dispenser period will not necessarily be altered. However, partial or complete clogging of the spray holes from liming will result in a reduction of the total quantity of hot water dispensed and a consequential increase in the strength of the brewed beverage over time.

In either event, the "throughput", i.e. the total quantity of coffee that can be made over a given time period using successive brew cycles, is reduced. In addition, the degree of control over the hot water dispense time period and the total quantity of hot water dispensed that is needed for production of brewed beverage of uniform and preselected characteristics is lost. Ultimately, if the spray plate is not cleaned of the liming residue, the entire array of spray holes can become so clogged that the brewer will cease to function completely function.

This liming problem has been addressed by attempting to reduce the quantity of calcium and other minerals dissolved in the water before it is passed through the spray head by means of lime and mineral commutation systems or reduction systems. While such dissolved mineral reduction reduces the rate of liming accumulation, it also requires the extra costs of purchase, maintenance and chemical supply replenishment for operation of the mineral commutation system, and if not all the liming and mineral deposits problems are removed from the water, liming residue accumulation will be reduced but not eliminated.

In the absence of a lime and mineral reduction and depending upon the level of dissolved calcium and other mineral compounds in the hot water, the only other solution to the liming problem has been frequent, routine, sometimes even daily, mechanical brushing or other cleaning of the spray plate to remove the calcium deposits from within and around the spray holes. Such cleaning is labor intensive and disables the brewer from operation during the cleaning. In addition, removal of the spray plate generally requires the use of tools to disassembly the plate from the spray head body.

Another problem with know spray head assemblies is that the velocity of the water droplets onto the top surface of the ingredient in the brew basket is directly related to the water pressure from the hot water dispense system and may impact the surface of the ingredient with sufficiently high impact energy to disadvantageously mechanically disturb the layer of ingredient and create undesirable splatter.

SUMMARY OF THE INVENTION

It is therefore an object of the invention to provide methods for distribution of hot water from a hot water dispense onto ingredient in a brew basket of a hot beverage brewer that ameliorates the problems noted above with respect known spray assemblies.

This objective is achieved in part by provision of a method for use in a hot water spray distribution assembly of a hot beverage brewer to distribute hot water from a hot water dispense system onto ingredient in a brew basket of the brewer by performance of the steps of passing hot water from the dispense system to an upright central core having a plurality of grooved passageways extending along an outer surface of the core; passing hot water through from outlets of the plurality of passageways directly to a top surface portion of an upwardly facing and outwardly and downwardly extending surface of a spray plate attached to the core for receipt and distribution of the hot water to the brew basket, said top surface portion being downwardly and outwardly tapered and in a location relatively central to the spray plate, said spray plate being downwardly and outwardly tapered from said location and extending to its outer periphery, and both said core and said upwardly facing surface being made of hydrophobic, nonmetalic, solid, material, with a heat transfer characteristic that is less than metal; and distributing the hot water across the hydrophobic, nonmetalic, solid material of the upwardly facing and outwardly and downwardly extending surface of the spray plate and off the spray plate onto the ingredient in the brew basket.

The objective is also partly acquired by providing a method for use in a hot water spray distribution assembly of a hot beverage brewer to distribute hot water from a hot water dispense system onto ingredient in a brew basket of the brewer by performing the steps of passing the hot water through a plurality of passageways formed in part by vertical grooves formed in the central core; passing hot water from outlets of the passageways directly onto a top surface portion of a distribution plate, said top surface portion being downwardly and outwardly tapered and in a location relatively central to the spray plate, said distribution plate being downwardly and outwardly tapered from said location and having an upwardly facing surface for receipt and distribution of hot water to the brew basket, said upwardly facing surface being made of hydrophobic, nonmetalic, solid, material, with a heat transfer characteristic that is less than metal, the hot water passing from the plurality of passageways to a corresponding plurality of upwardly facing grooves in the spray plate surface with surfaces made of hydrophobic, nonmetalic, solid, material that are aligned with the plurality of passageways, respectively; and distributing the hot water across the hydrophobic, nonmetalic, solid material of the spray plate and off the spray plate onto the ingredient in the brew basket.

Also, the objective is obtained partly by provision of a method of distributing hot water onto a layer of beverage ingredient within a brew basket, comprising the steps of: forming a plurality of downwardly directed hot water passageways extending from a source of the hot water to a generally laterally, outwardly, downwardly extending top surface of a spray plate by releasably joining together an upstanding central hub of the spray plate with a plurality of outwardly facing, vertical grooves corresponding to the plurality of passageways formed in an outwardly facing surface of the hub with a complementary tubular part connected with the source of the hot water and snuggly fitted over the outwardly facing surface to form at least part of each of the plurality of vertical passageways; passing hot water from the source to the top surface of the upstanding spray plate through the plurality of passageways; separating the complementary tubular part from the upstanding central hub to expose the vertical grooves along for purposes of cleaning interiors of the grooves; cleaning the interiors of the grooves while the upstanding central hub and the vertical grooves are separated; rejoining the upstanding central hub and the complementary tubular part together to reform the plurality of passageways between the source and the distribution plate; and passing hot water passed to the water distribution spray plate onto a beverage ingredient within a brew basket along the passageways after being cleaned and reformed.

Additionally, the objective is obtained in part by provision of a method of distributing hot water from a hot water dispense system onto ingredient in a brew basket of a hot beverage brewer, by performance of the steps of rotatably mounting one spray distribution member to another, complementary spray distribution member, and rotating the one spray distribution member relative to the other spray distribution member to scrape residue off at least one of the one distribution member and the other distribution member, one of the spray distribution members having elongate water-carrying outwardly facing grooves that form hot water passageways when joined to the other spray distribution member, said outwardly facing grooves having outermost edges that scrape residue off the other one of the distribution members during rotation; and passing hot water onto the ingredient in the brew basket though the passageways formed between the one distribution member and the other distribution member after the residue has been scraped off.

Further, the objective is acquired by providing a method of distributing hot water onto a layer of beverage ingredient within a brew basket of a hot beverage brewer, by performing the steps of filling a water cavity with hot water from a hot water dispensing system; selectively opening an inlet to a passageway to pass hot water from the water cavity through the passageway; receiving the hot water directly from an outlet of the passageway directly onto a top surface portion of a distribution plate, said distribution plate being downwardly and outwardly tapered from said location and extending to its outer periphery said distribution plate made from a hydrophobic, nonmetalic, solid, material; and passing the hot water downwardly and outwardly along the top surface to a peripheral edge of the top surface.

Moreover, the object of the invention is achieved in part by providing a method of distributing hot water from a hot water dispense system onto ingredient in a brew basket of a brewer, by performing the steps of passing hot water onto a central portion of an upwardly facing surface of an umbrella-like body with an upwardly facing surface made of hydrophobic, nonmetalic, solid, material, with a heat transfer characteristic that is less than metal for receipt and distribution of hot water to the brew basket, said step of passing including the step of passing hot water from the dispense system only down a plurality of passageways formed in an upstanding core joined to the central portion of the umbrella-like body to guide hot water directly to the umbrella-like body for distribution by the body to the brew basket; and allowing the hot water received from an outlet end of the passageways to cascade downwardly and outwardly along the upwardly facing surface and off of distal edges of the umbrella-like body located above the brew basket of the brewer.

BRIEF DESCRIPTION OF THE DRAWINGS

The foregoing objects and advantageous features of the invention will be described below and other advantageous features will be made apparent from a detailed description of a preferred embodiment of the invention in which:

FIG. 7 is a sectional side view similar to that of FIG. 2 but illustrating connection to the water dispense system and to a solenoid controlled valve with the valve in a closed position;

FIG. 8 is a sectional side view similar to that of FIG. 2 but illustrating connection to the water dispense system and to a solenoid controlled valve with the valve in an open position;

DETAILED DESCRIPTION

Figure 1:
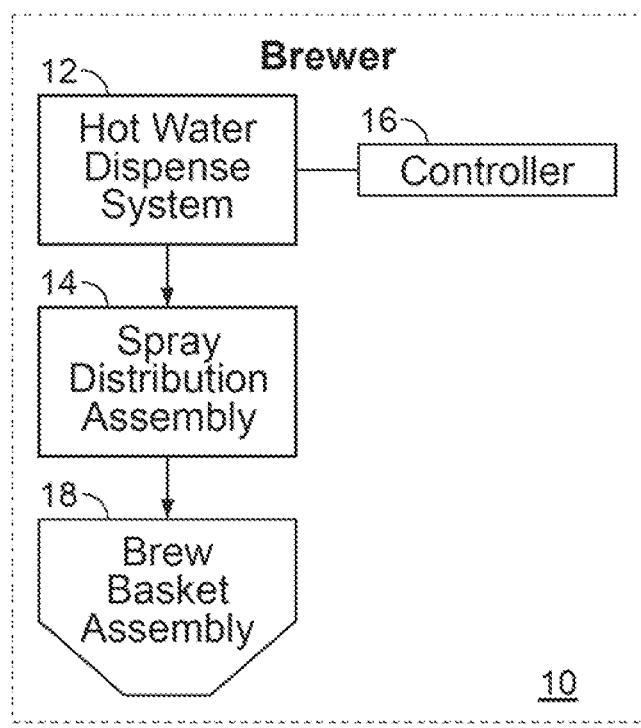
FIG. 1 is a functional block diagram of a brewer constructed in accordance with the invention.

Referring to FIG. 1, a preferred embodiment of the hot beverage brewer 10 of the present invention is seen to have a hot water dispense system 12 that selectively passes hot water from a hot water tank to a spray distribution assembly 14 under control of a controller 16. The hot water is passed from the spray distribution assembly 14 to the brew basket assembly 18. The brew basket assembly 18 has an internal filter holder that contains the beverage ingredient while hot water is passed through the ingredient to brew the hot beverage, such as hot coffee or tea, or hot tea extract used to make iced tea. The hot beverage or extract is then passed through a drain hole at the bottom of the brew basket 14 into a suitable beverage container. In the case of an iced tea brewer, cold water is also added to the beverage container and mixes with the abstract.

The hot water dispense system 12, the controller 16 and the brew basket assembly are well know in their structures and functions and may be conventional. If further information is desired, examples of brewers may be seen in U.S. Pat. No. 5,000,082 issued Mar. 19, 1991 to Lassota for "Beverage Maker and Method of Making Beverage"; U.S. Pat. No. 6,148,717 issued Nov. 21, 2000 to Lassota for "Beverage Maker with Intermittent Beverage Liquid Dispenser and Apparatus and Method for Uniform Contact of Brew Ingredient with Brew"; and U.S. Pat. No. 6,571,685 issued Mar. 30, 2004 to Lassota for "Oxygenated Tea Maker and Method"; and patents cited therein, all of which are hereby incorporated by reference.

Figure 2:
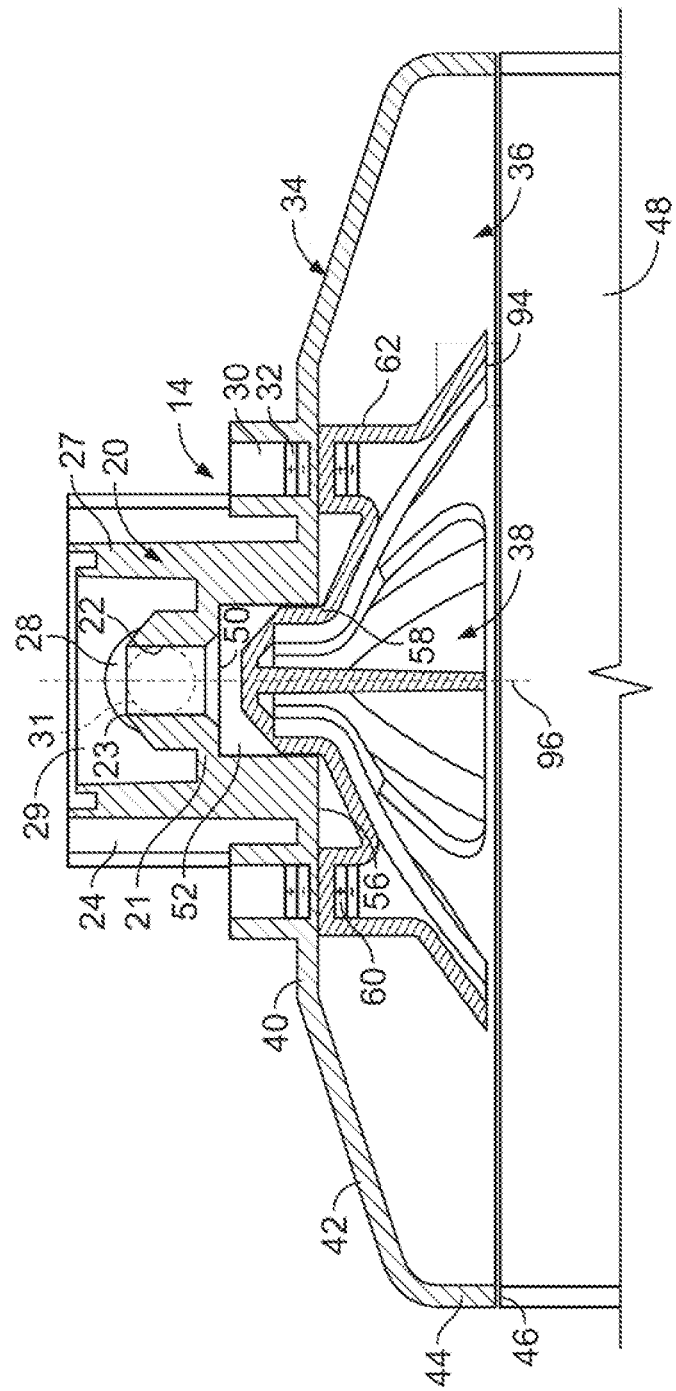
FIG. 2 is a sectional side view of a preferred embodiment of the spray distribution assembly of FIG. 1 in which the spray distribution member is assembled in operative relationship with the spray head to which it is releasably mounted.
Figure 3:
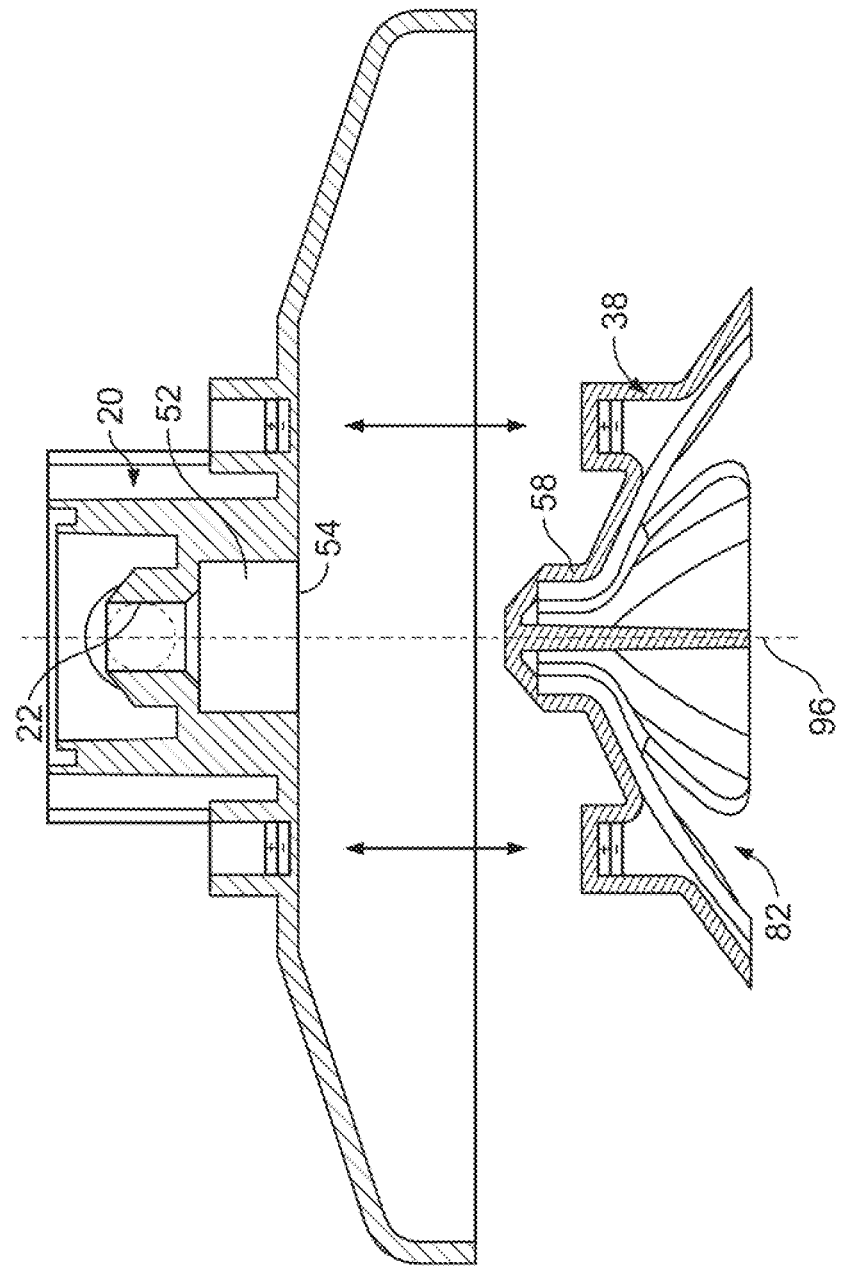
FIG. 3 is a sectional side view similar to that of FIG. 2 but in which the spray distribution member is separated from the spray head for purposes of cleaning.

In accordance with the present invention the spray distribution assembly 14 is provided with novel advantageous features that overcomes the disadvantages of known spray heads or spray head assemblies. Referring to FIGS. 2 and 3, the spray distribution assembly, or spray cutter, 14 includes a cover section, or spray head assembly, 20 with a central, cylindrical passageway 22 that is connectable to the hot water dispense system 12. The passageway 22 is surrounded by a multi-walled, upstanding annular collar 24 for connection with an interior, upstanding cylindrical wall 21 with a tapered top that ends in a circular, relatively narrow bead 23. The bead 23 is mated with a vertically movably mounted solenoid controlled closure member 108, described below with reference to FIGS. 7 and 8, to selectively close an inlet 28 of the passageway 22.

The upstanding collar 24 is surrounded by a cylindrical wall 27 to provide an interior water cavity 29. The interior of the water cavity 29 is filled with hot water via a hot water inlet 31 extending through the cylindrical wall 27 and permanently connected with the hot water dispense system 12. When the closure member 108 is lifted off the bead 23, the inlet 28 is open and hot water flows from the hot water inlet 31, through the cavity 29 and downwardly through the passageway 22. When the closure member 108 is lowered down into watertight mating engagement with the bead 23 surrounding the inlet 28, the inlet is closed and the flow of hot water through the passageway 28 is terminated.

Preferably, the cover section, or spray head assembly, 20 including the umbrella 34 and the annular collar 24, is made from polysulfone, or PSU, plastic. This polymer is extensively used commercially for plumbing part for hot water, and will not interact chemically with the divalent alkali metal bicarbonate and carbonates and sulfates in the water to cause pitting and erosion as will occur if it were made of metal, such as stainless steel.

In addition, surrounding the base of the annular collar 24 is an annular channel 30 with a bottom to which one or more magnetic connection members 32 are mounted. The connection members 32 may be a single annular piece that snuggly fits within the annular channel 30 and may be made of either permanent magnetic material or made of ferromagnetic material.

Surrounding the annular channel 30 is an umbrella-like member 34 defining a downwardly facing cavity 36 within which a unique spray plate, or distribution plate, 38 is mounted. The umbrella 34 has a relatively narrow, annular section 40 joined to a conical section 42 that extends outwardly and downwardly away from the annular section 40 horizontal section to a cylindrical skirt section 44. These sections have relatively smooth continuous interior surfaces that face downwardly and deflect downwardly any upwardly directed splashes of hot water or steam. The circular downwardly facing opening defined by the cylindrical skirt section 44 is coextensive with the upwardly facing opening of the brew basket assembly 18 and abuts against the top edge 46 of the brew basket housing 48 of the brew basket assembly 18.

Accordingly, any water striking or steam condensing on the interior surfaces of the umbrella 34 will drop down into the brew basket housing 48.

The passageway 22 has an outlet end 50 that opens into a somewhat wider cylindrical mounting cavity 52. The cylindrical mounting cavity 52 has a downwardly facing opening 54 formed in a downwardly facing wall 56 that is aligned with the annular horizontal section. A central upstanding inlet core 58 of the spray plate is slideably received through the opening 54 and releasably held in a fully inserted position by magnetic attraction of the magnetic connector member 32 with magnetic connector members 60 mounted at the tops of a pair of hollow, upstanding, cylindrical mounting posts 62 of the spray plate 38. If both the magnetic connector member 32 and the magnetic connector member 60 are permanent magnets then they are mounted so that their opposite poles, either positive and negative or negative and positive, are located adjacent each other in mutual attractive relationship. Otherwise, one of the magnetic connector members 32 and 60 is a permanent magnet and the other one of the magnetic connector members 32 and 60 is a ferromagnetic material that is magnetically attracted to the permanent magnet.

Because the magnetic connector members 32 are annular magnetic attraction occurs independently of the relative angular relationship of the upper section 20 and the spray plate 38. No effort is needed to align the magnetic connector members 62 with the magnetic connector members 32.

In any event, once the spray plate 38 is located in the operative position relative to the upper section 20 with the central inlet core fully inserted within the cylindrical mounting cavity 52 and the top of upstanding annular post 62 abutting the bottom of the annular channel 30, as shown in FIG. 2, the mutual magnetic attraction of the magnetic connector members 32 and 60 releasably holds the spray plate in the operative position, as shown. As seen in FIG. 3, when it is desired to separate the spray plate 38 from the upper section 20, all that need be done is to separate them from one another until the central core 58 has been slid out of the cavity 52 and the magnetic connectors 32 and 60 moved sufficiently apart to break the mutual magnetic attraction. Advantageously, such separation that is needed for purposes of cleaning, repair or replacement is achievable manually without the need for any tools.

Figure 4:
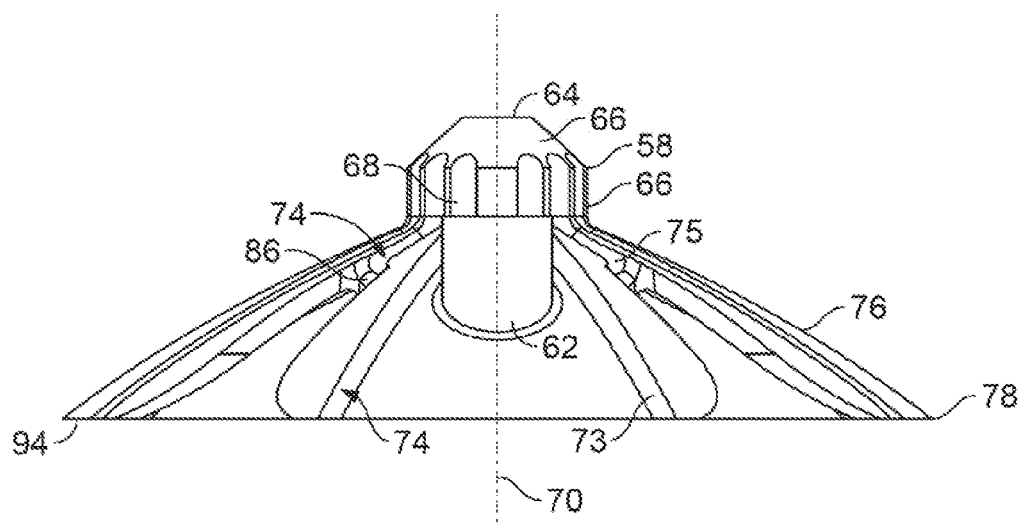
FIG. 4 is a side elevation view of the spray distribution member of FIGS. 2 and 3.
Figure 5:
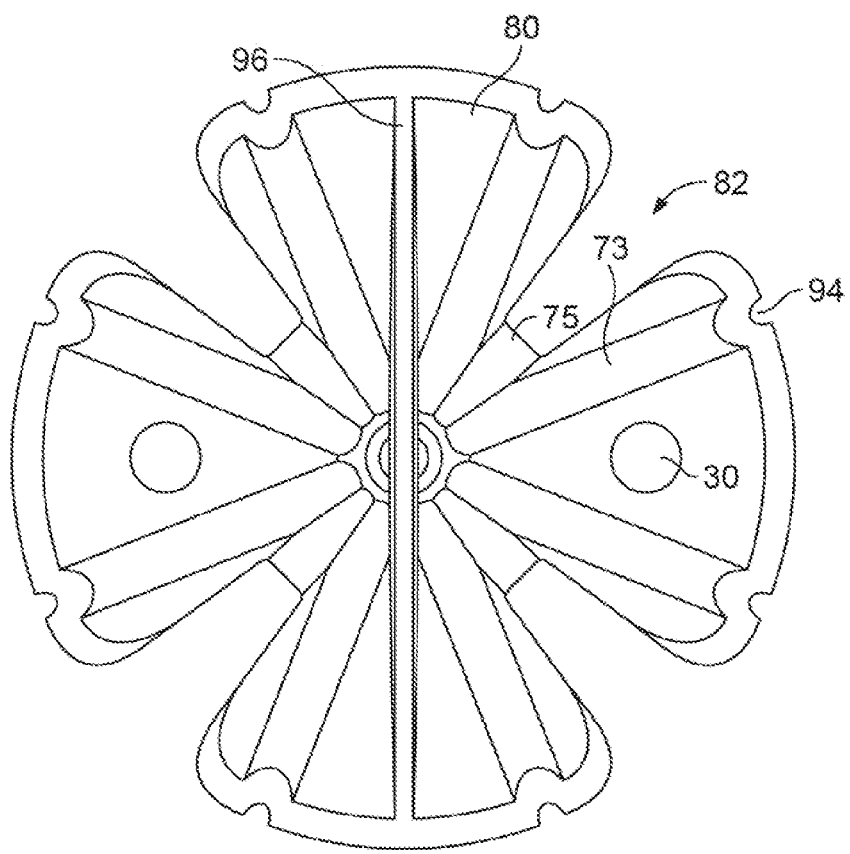
FIG. 5 is a plan view of the spray distribution member of FIG. 4.
Figure 6:
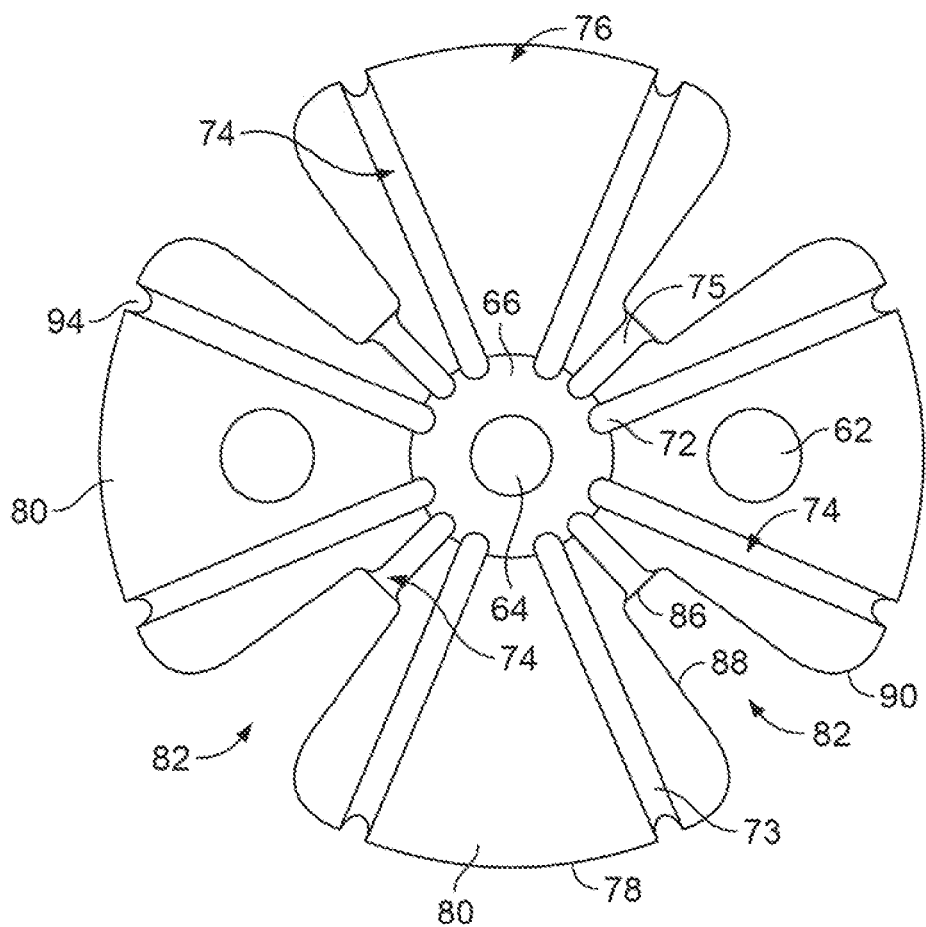
FIG. 6 is a bottom view of the spray distribution member of FIGS. 4 and 5.

Referring now to FIGS. 4, 5 and 6, the upstanding central hub 58 of the spray plate, or spray cutter is seen to have a flat, circular top 64, a generally cylindrical side wall 66 and outwardly, downwardly extending truncated generally conical section 66 joining the cylindrical side wall 66 to the top 64. The sidewall 66 has vertical grooves, or passageways, 68 that are parallel to the central axis of symmetry 70 and have inlet ends 72 facing upwardly to receive water that cascades down the side of the conical section 66 that is received in the top of the cavity 52.

Each of these downwardly extending twelve grooves 68 communicates with one of twelve radially outwardly extending mating grooves, or passageways, 74 formed in a truncated, generally conical distribution plate 76. While the distribution plate may be perfectly conical, preferably it is slightly outwardly curved. The distribution plate 76 extends radially outwardly and downwardly from the hub 58 to die outer periphery 78 of the distribution plate. As best seen in FIG. 6, the outer periphery 78 is not circular but has a flower pedal-like shape with four pedals 80 separated by gaps 82 that extend inwardly from the outermost part 84 of the periphery 78 to an inner location 86 spaced from the hub 58 intermediate the hub 58 and the outermost part 84. Each of the four gaps 82 has an inner relatively narrow portion adjacent the inner location 86 joined to the distal outlet end of one of four relatively shorter ones 75 of twelve grooves 74. The gaps 82 are all the same size and are equally spaced around the hub 58. The gaps 82 have symmetrical opposite tapered sides 88 that are tapered outwardly from each other and merged with outwardly curved sections 90. The outwardly curved sections 90 merge with and join the outermost part 84 of the pedals 80 on opposite sides of the gap 82 with the tapered sides 88.

Each gap 82 has one associated shorter one 75 of the groves 74, and each of the pedals 80 has two relatively longer ones 73 of the grooves 74 located adjacent opposite sides 92 of the pedals 80. Each of the longer grooves terminates relatively flat undercut bottom 94 that creates a downwardly facing groove outlet 94.

Referring to FIGS. 5 and 2, a handle 96 extends downwardly from the top of the hub 58 to the level of the flat bottom 94 and extends diametrically across the generally conical distribution plate 76 between the centers of two of the opposite pedals 80. This divides the interior underside of the spray plate 38 into two equal parts and enhances the structural rigidity of the generally conical spray plate 38. The handle 96 also function as a dividing wall prevents water from the relatively short grooves 75 from passing from one side of the dividing wall 96 to the other side of the dividing wall 96.

The handle 96 may be manually grasped to pull the distribution plate 76 downwardly from the releasable connection with the upper section 20 or to move it upwardly into the operative position shown in FIG. 2. Advantageously, the handle 96 being aligned with the center of the spray plate 38 has at least a central section that is inside of, and spaced from, the main streams of hot water being distributed. Accordingly, the maximum temperature of the handle 95 is relatively reduced so that it does not become too hot to handle safely.

In accordance with one aspect of the invention, the handle 96 is used for another important cleaning function that does not require separation of spray plate 38 from the upper section. Instead, any lime encrustation or crystallized coffee oils or the like that may form at the sides of the vertical grooves 68 and on the interior surface of the mounting cavity 52 may be removed by simply manually rotating the spray plate 38 while the hub 58 remains mounted in the operative position snuggly received within and abutting the interior surface of the mounting cavity 52. Such rotation is preferably achieved by grasping the handle and using it to manually effect the rotation. Preferably, the rotation is performed with a vigorous, but relatively short-stroke, "back and forth" motion in which the direction of rotation is repeatedly reversed. Such back and forth movement scrapes the lagging ones of the outermost side edges of the grooves 68 against the interior surface and thereby scrapes the lime deposits, etc. off of the interior surface to fall out of the mounting cavity 52 and out through the bottom outlets of the grooves and down the upper surface of the spray plate 38 to fall of the edge of the distribution plate.

Alternatively, the rotation is only in one direction but is trough a sufficient radial angle to insure that at least one lagging edge has scrapped over a lime deposit location. In addition to scrapping, the rotary movement also breaks any mechanical bond that may have been formed by deposits joining side edge of the grooves 68 to the interior surface of the cavity 52 which will causes pieces of deposits to break off and thereby weaken the structural integrity of any deposits still remaining. Importantly, this relative rotary movement while still assembled is enabled by the magnetic mounting that employs an annular magnetic element 32 and a magnetic connection that permits such relative rotary movement.

During operation, water under generally uniform pressure is passed through the passageway and into the cylindrical mounting cavity in the space above the top 64 of the hub connection cavity 52. This water is channeled downwardly through the vertical grooves 68 and into the mating radially extending grooves 74. Unlike the grooves 68 within the cylindrical cavity 52 that are closed by the snug fit with the interior surface of the ace of the cavity 52, the upwardly facing grooves 74 are not closed and may overflow the banks of the grooves 74, particularly the relatively long grooves 73. In such case, the water may flow down the curved, generally conical upper surface 98 of the pedals between the relatively long grooves 73 to the peripheral edge 78 and may also overflow from the relatively long grooves 73 and off the sides 88 and 90 of the gaps 82. Water that does not overflow remains in the grooves and exits at the groove outlets 94 or, in the case of the relatively short grooves 75, flows off the innermost edge of the gaps 82.

It has been found that this spray distribution assembly has numerous advantages over known spray heads. First, the water is more evenly distributed, for once the water passes from the vertical grooves, it is no longer under pressure. Once the pressure is removed, the velocity and flow of the water is more controlled by gravity and the shape and configuration of the rounded but generally conical surface of the dome-like spray plate 38. The water cascades downwardly along the surface of the spray plate 38 and over the corrugated edge onto the ingredient. Accordingly, the speed and kinetic energy of each of the water droplets, as they impact the top surface of the beverage ingredient within the brew basket assembly 18 is reduced relative to that produced with a conventional shower head-like spray plate of the prior art to relatively reduce agitation of the ingredient and resultant splatter. While there are some small streams created, the overall effect is to create beneath the spray plate 38 a generally distributed "cloud" of water droplets.

Importantly, unlike spray heads that rely upon a spray plate with a plurality of relatively small holes are highly susceptible to clogging due to calcification liming or other mineral deposits, the top surface of the spray plate 38 including the grooves 74 and the open outlet ends of the grooves 74 and the gaps 82 are not relatively subject to clogging due to deposits. As noted above, clogging of the vertical grooves 68 in the hub is eliminated by the relative rotary cleaning movement of the spray plate 38 while still mounted in operative position.

Generally, because of the rounded conical shape of the spray plate 38 any lime or the like is simply washed off the relatively wide and open surfaces so that the distribution plate is generally self-cleaning. However, should the spray plate 38 or the upper section 20 require cleaning, they may be easily separated for cleaning and the cleaning may be effected easily due to the lack of any small holes or other surfaces difficult to access for cleaning purposes. In keeping with an important aspect of the invention, unlike known spray heads that require tools for separation, separation may also be easily made for purposes of repair or replacement as noted above with respect to use of the handle 96.

The approximate width of the spray plate 38 is three inches, and the width of the grooves 74 is approximately one-tenth inch. In keeping with an important aspect of the invention, the spray plate 38 is preferably entirely made from an injection molded polymer plastic that is hydrophobic, has non-adhesive characteristics, and has a heat transfer coefficient substantially less than that of stainless steel or other such metals from which spray heads or spray plates have been made in the past. Preferably, the entire spray plate 38 including the umbrella, or cascading spray dome, section 66, and the upstanding central hub, or core, 58 is integrally injection molded together as a single integrated molded piece made entirely and solidly of plastic with no metal included, whatsoever. The hydrophobic molded plastic is preferably polypropylene or similar material approved by the FDA for use in contact with food for human consumption, such as injection moldable polypropylene or similar material.

The inventors have become aware that forming the entire spray plate 38 out of injection molded polymer, without the use of any metal solves multiple problems. First, the use of metal surfaces in contact with the water of prior art spray plates results in the attraction of calcium carbonate, calcium sulfate and other divalent alkali metal bicarbonates. There are weak electron bonds that form when H+ is present from divalent alkali metal bicarbonate to carbonate reaction from the cooling of the mineralized hot water as it evaporates off of the metal surface.

Thus, the surface of the metal reacts with the water and minerals in the water with which it comes into contact. These retained minerals cause complex chemical reactions that cause pitting or other erosion of the metal surface. These pitted or eroded sites on the metal surface allow degradation of the water flow pattern which results in further buildup of encrusted mineral by accretion. In accordance with the invention, these problems are overcome in part by providing an outer surface made from very smooth, food-grade polymeric material that does not have these deleterious chemical reaction that are experienced with metal spray plate surfaces.

The problem with metallic surfaces, including stainless steel, is compounded when the water, instead of flowing off of the spray plate surface, remains on the surface after a hot water dispense cycle and evaporates off of the surface and leaves dissolved solids behind adhering to the metal surface. The metal has a high rate of heat conductance and thus absorbs substantial amounts of heat from the hot water while the hot water passes over its surface and then rapidly releases this heat to the remaining water on the surface after the end of the dispense cycle. The rapidly released heat caused by the high heat transfer coefficient of the metal thereby exacerbates the evaporation problem.

Unfortunately, this problem is present to a degree even if the metal surface is coated with PTFE, such as Teflon®, or the like because the coating is insufficiently thick to slow the heating of the metal and subsequent rapid release of heat. Even with a polymer coating, the resultant evaporation still results in an undesirable build up of minerals left behind on the polymer coating.

Customarily, metal spray assemblies employ a perforated flat plate such that the water does not rapidly run off of the metal surface, but even if the surface of the plate is domed to facilitate a rapid runoff of the water from the surface, as in the present invention, it has been found that with a metal core, evaporation and resultant encrustation of the polymer coating still can result to an undesirable degree. If the surface is channeled, as in the spray plate of the present invention, then there is more surface area for evaporation to occur than in a continuous surface, and there is even a greater need to avoid the use of metal. In accordance with an important aspect of the present invention, the advantages of the dome-shaped spray plate 38 rapidly shedding residual water that could evaporate is enhanced by making the entire spray plate from polypropylene or the like to further reduce evaporation off the surface of the spray plate due to rapid heat transfer from the spray plate 38 to the residual water remaining on the surface of the spray plate 38, as would occur if the spray plate were made of metal.

Thus, preferably, all metal is avoided, and the domed spray plate 38 of the present invention is made entirely of injection molded polymeric material, preferably polypropylene, or the like, having a much smaller heat transfer characteristic than that of metal, and the mineral buildup due to evaporation of residual water is thereby substantially reduced. In such case, heat is neither absorbed from the hot water during the hot water dispense period nor released to the surface of the spray plate after the end of the dispense period as rapidly as when a metal core is present. Accordingly, mineral buildup due to evaporation of residual water off the surfaces of the spray plate is substantially reduced relative to that when metal is present as a component of the spray plate 38.

It is therefore seen that the embodiment of the spray plate of the present invention in which the entire spray plate is made of injection molded polymeric material, such as polypropylene, polybutylene, polyamide, polysulfone or other injection moldable polymer, or the like, without the presence of metal overcome the encrustation problem in multiple ways. Because the polymer is hydrophobic, residual water retention on the surface and water film formation is reduced so that there is less water on the surface to evaporate. Because of the coefficient of heat transfer being substantially lower than that of metal, there is less heat being generated to cause evaporation of any residual water remaining. Because the surface of the spray plate has no metal exposed, and the polymeric material is relatively chemically inert and does not react with divalent alkali metal carbonates and sulfates, surface pitting and other surface erosion that occurs with metal surfaces is avoided. Because of the of the dome-like shape and the hydrophobic properties of polymeric material relative to that of metal, water drains off of the surfaces of the spray plate 38 rapidly to further reduce the problems due to evaporation while a desirable distribution pattern of hot water onto the ingredient in the brew basket is still established.

While it is preferred to make the entire spray plate 38 out of polymeric material, it should be appreciated that even if the polymer is only a coating on a metal base, the benefits of the hydrophobic properties and chemically inert properties noted above are partially still obtained. The benefits of the polymer having a low heat transfer coefficient are also obtained but only to a proportional degree. In such case, in an alternative embodiment of the present invention, a metal base is provided with a smooth outer surface coating of a polymer or other material with non-adhesive, hydrophobic and relatively low heater transfer characteristics less than that of steel or other metal. Again, any such coating or material should be approved by the FDA to be safe for use in contact with food for human consumption.

Preferably, the coating material used for the outer surface coating has a coefficient of friction less than that of the stainless steel. Preferably, the material of the outer surface coating 68 is a synthetic, non-corrosive material, such as a fluoropolymer that is approved for contact with human food. Preferably, the coating material can be readily painted or applied as a strong adhering coating to stainless steel and will maintain integrity at near boiling temperatures while in contact with water. Preferably, the coating is made of a polytetrafluoroethylene, or PTFE. One such suitable material is TECHNOLOGY TEFLON® which is a self-priming, one-coat blend of fluoropolymer (420-104 Gray) with other resins of the type used on coffee plate warmers, assorted food-processing utensils, clothes-iron, sole plates and portable sandwich makers, or the like. This Teflon® has a cure temperature of approximately 752-degrees Fahrenheit and a service temperature of approximately 500-degrees Fahrenheit made by DuPont®. The thickness 70, FIG. 6, of the outer surface coating is approximately 0.001-inch although thinner coating may still function well but can be more easily scratched away from the outer surface of the base.

Alternatively, the spray plate can be coated with polyamide, polypropylene, epoxy, silicone or the like although PTFE is preferred for practical reasons.

Referring to FIGS. 7 and 8, preferably the water enters into the passageway 22 from a closed cavity 100 that is fed water via a radially extending nipple 102 connected to a drain hose from the hot water tank of the hot water dispense system. The top of the cavity 100 is closed by a mounting plate 104 of a solenoid-controlled valve 106. The solenoid-controlled valve is controlled by the controller 16 to selectively close and open the inlet 28 to the passageway 22. As seen in FIG. 7, when the solenoid controlled valve is open, a plunger with a closure member 108 at the distal end is moved into a closed position in which the closure member 108 is pressed against the inlet 28 to block water from entering into the passageway 22 from the cavity 100. As seen in FIG. 8, when the solenoid is open, the closure member 108 is raised away from the inlet 28 to a position spaced from the inlet 28 to open the passageway 22 for entry and passage of water entered into the cavity 100 through the nipple 102. With this side water entry arrangement, the cylindrical 112 is located in advantageously positioned directly opposite the nipple opening 114 to deflect and reduce the momentum of the stream of hot water being introduced to the cavity 100 so that the rate water enters into the inlet 28 is based on the water pressure alone and not on the speed of the inlet flow.

Figure 11:
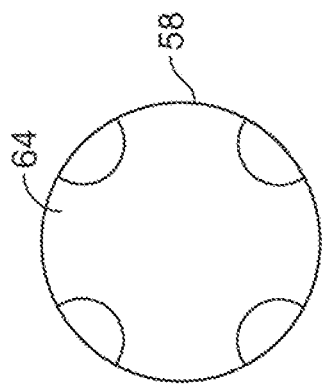
FIG. 11 is a schematic view of a hub like that of FIG. 2 but illustrating an alternative pattern for the vertical channels formed in the hub that may be used in lieu of the groove patterns of FIGS. 2 and 8 when a relatively larger volume of water is being distributed.
Figure 10:
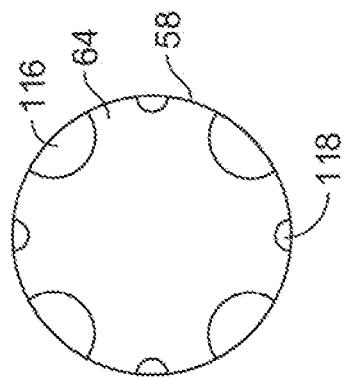
FIG. 10 is a schematic view of a hub like that of FIG. 2 but illustrating an alternative pattern for the vertical channels formed in the hub that may be used in lieu of the groove patterns of FIGS. 2 and 8 when a relatively larger volume of water is being distributed.
Figure 9:
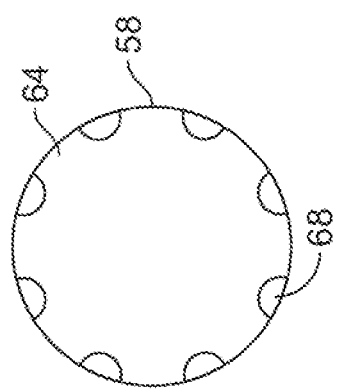
FIG. 9 is a schematic plan view of a hub like that of FIG. 2 but illustrating an alternative pattern for the vertical channels formed in the hub that may be used in lieu of the groove pattern illustrated in FIG. 2.

Referring now to FIG. 9, different patterns and sizes of the vertical grooves may successfully employed. In the pattern shown in FIG. 9, there are only eight groves and two grooves are assigned to each petal 80. In FIG. 10, there are four relatively large vertical grooves 116 that are branched into two relatively long grooves 73 on each petal 80 and four relatively small vertical grooves 118 are matched to fee four short grooves 75. In FIG. 11, there are only four large groves 116 and each one feeds two long grooves 73 on a petal and one short groove feeding a relatively short groove 75. The patterns of FIGS. 10 and 11 may be more suitable for higher rates of flow than the rates best employed with the patterns of FIGS. 2 and 9.

Figure 12:
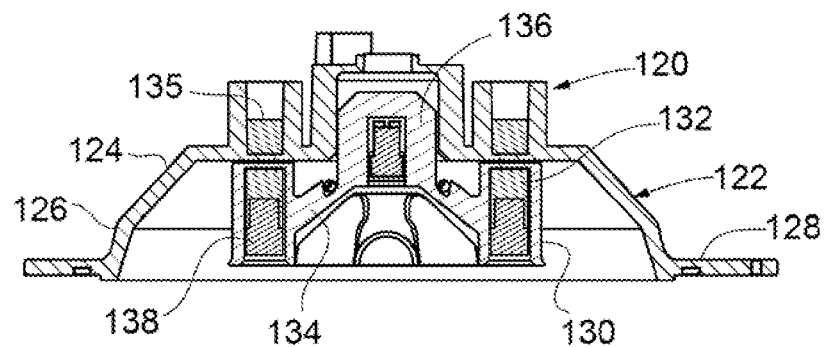
FIG. 12 is a side sectional view of another embodiment of a spray distribution assembly, or spray head, similar to that of FIGS. 1-11 but having a slightly different configuration.
Figure 13:
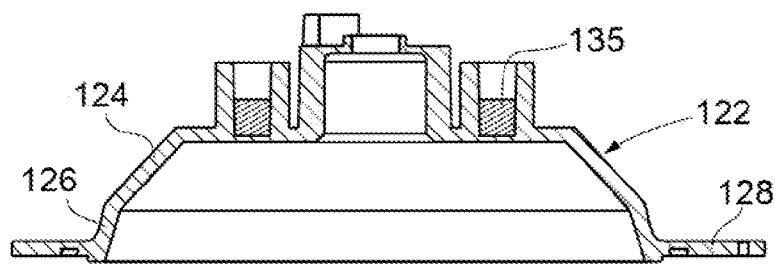
FIG. 13 is a side sectional view of the cover section of FIG. 12 apart from the other elements of the spray distribution assembly.
Figure 14:
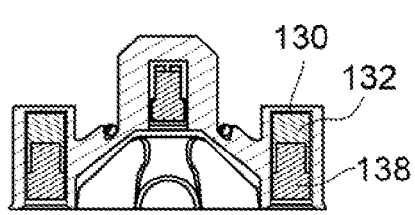
FIG. 14 is a side sectional view of the spray plate of FIG. 12 apart from the other elements of the spray distribution assembly.
Figure 15:
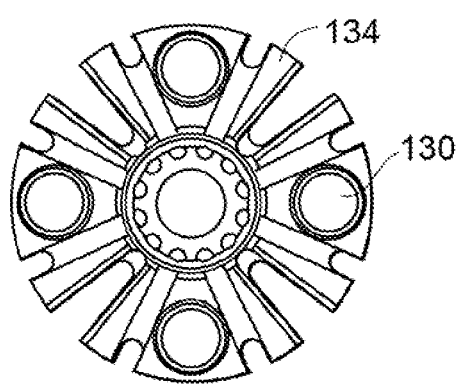
FIG. 15 is a plan view of the spray plate of FIG. 14.

Referring to FIGS. 12, 13, 14 and 15, another embodiment of the spray distribution assembly 14 is shown that is designated by reference numeral 120. Unlike the distribution assembly 14, the distribution assembly 130 has an umbrella-like member 122 that has a side with a conical section 124 that is steeper than that of assembly 14 and a still steeper conical bottom section 126 in lieu of a cylindrical section. The umbrella-like member 122 is relatively narrower than the open top of the brew basket with which it is intended to be used. Accordingly, an annular closure collar 128 extends radially outwardly from the bottom of the conical bottom section 126 that extends outwardly to the edge of the brew basket opening to block any upwardly directed splashes, etc. As best seen in FIGS. 14 and 15, there are four substantially upstanding, cylindrical mounting posts 130 holding permanent magnet or ferromagnetic elements 132 instead of only two, and the four posts 130 are located adjacent to the outer edge of the spray plate 134 instead of being closer to the central portion and the inlet core 136. The magnetic elements interact with mating magnetic elements 135. As seen in FIGS. 12 and 14, there are four identical plugs 138 that fill the bottoms of the mounting posts to block the entry of water etc. and assist in holding the magnetic element 132 in place. There are other slight variations in the configuration that can be appreciated by comparing the drawing figures, but the overall function and operation remains the same as the earlier embodiment of FIGS. 2 and 3.

Figure 16:
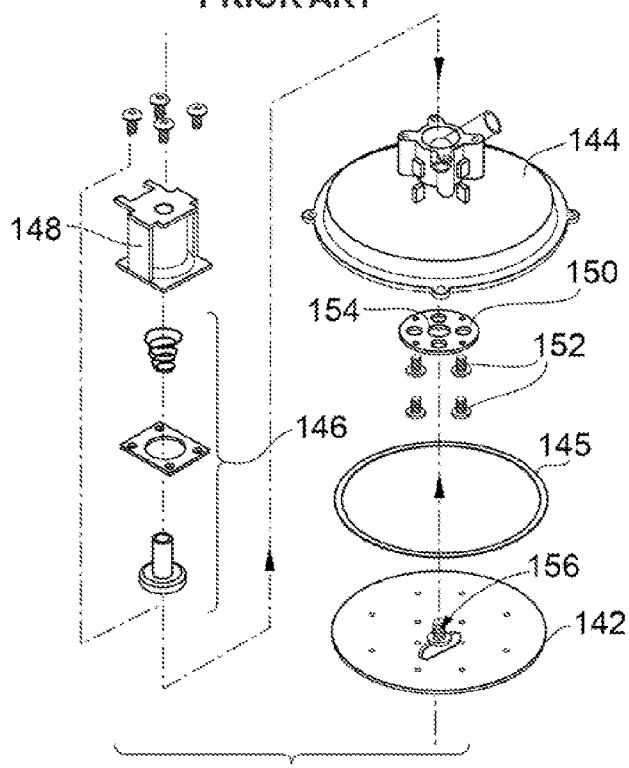
FIG. 16 is an exploded view of another spray distribution assembly with a flat metal spray plate covered with a coating of PTFE plastic.
Figure 17:
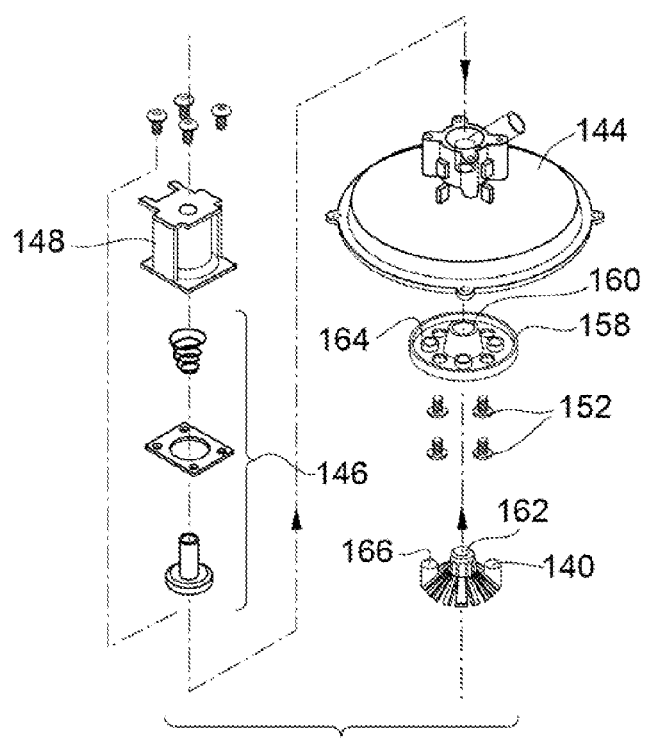
FIG. 17 is an exploded view of the spray distribution assembly of FIG. 12 that has been changed with the use of an adapter to enable the flat spray plate to be replaced by the PTFE plastic spray plate of the present invention.

Referring to FIGS. 16 and 17, the invention includes means and a method of retrofitting a prior art spray assembly shown in FIG. 16 having a flat, circular bottom spray plate 142 containing an array of spray holes with a spray plate 140 of the present invention shown in FIG. 17. The prior art spray distribution assembly of FIG. 16 has a downturned cup shaped spray housing 144 with a closed top for receipt of hot water from a hot water tank (not shown) though a valve assembly 146 controlled by a solenoid 148. The flat spray plate is sealed to the bottom opening of the housing 144 by a gasket 145 and is releasably attached to the cup shaped spray housing 144 to close the open bottom except for passage of water though the spray holes. A mounting member 150 is attached to the underside of the housing 144 by means of four identical threaded fasteners 152, such as screws that are received in mating threaded screw holes in the housing 144. The mounting plate has a centrally located female mounting connector 154 within which is received a centrally located mating male connector 156 carried at the top of the flat spray plate 142.

Referring to FIG. 17, in accordance with the retrofitting method of the present invention, the retrofitting is achieved by means of the following steps. First, the flat spray plate 142 is detached from mounting member 150 by manipulation of the connector member 156 to detach the flat spray plate 142 from the cup shaped spray housing 144. Next, the mounting member 150, itself, is detached from the flat the spray housing 144 by removing the screws 152. The plate 142, gasket 145 and mounting member 150 may then be discarded. Then the flat spray plate mounting member 150 is replaced with a mounting adapter 158 by using the same screws 152. Both the mounting member and the mounting adapter have connector holes aligned with the mating threaded connectors and one of the threaded fasteners and the threaded mating connectors extends though the mounting holes. Then the dome-shaped spray plate assembly 140 is releasably attached to the mounting adapter 158. The mounting adapter 152 has configuration that mates with spray plate assembly 140 and has an upwardly extending receptacle 160 for the central core 162, and magnetic elements 164 for mating magnetic attraction with the magnetic elements 166 of the spray plate assembly 140

Thus, the step of releasably attaching includes the step of releasably attaching with mutually attractive magnetic elements 164 and 166 and also includes the step of inserting the upright central core 162 within the mating female connector 160 carried by the mounting adapter 158. The top of the female connector has an opening at the top that is selectively closed by means of the valve assembly 146. The mutually attractive magnetic elements 166 and 164 are automatically moved into magnetic attractive proximity to each other when the upright central core 162 is inserted into the mating female receptacle 160.

Figure 18:
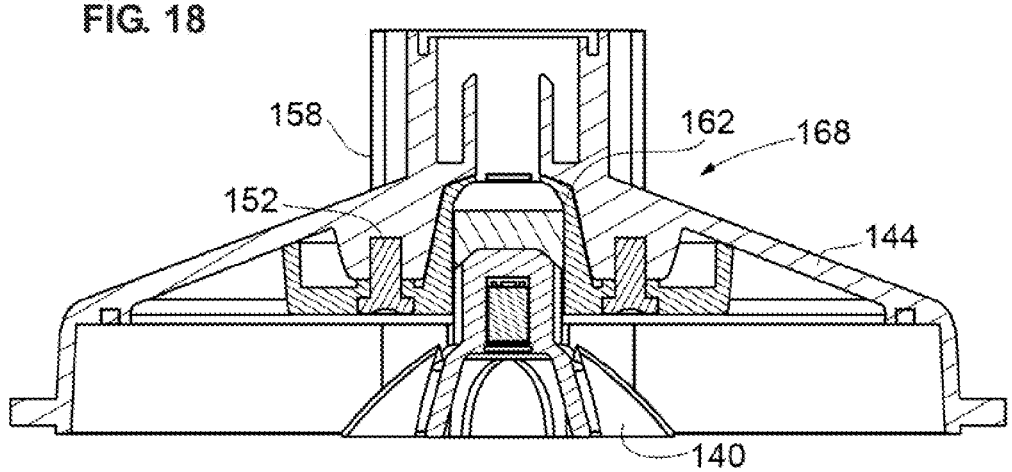
FIG. 18 is a side section view showing the spray plate of FIG. 17 fully retrofit-assembled with the cover section of FIG. 16 in place of the flat metal spray plate.

Referring now to FIG. 18, a sectional side view of one version 168 of the retrofit spray assembly is shown to more clearly illustrate the configuration after the retrofit operation, in which the same reference numerals used in FIGS. 17 and 18 are used for corresponding parts.

Figure 19:
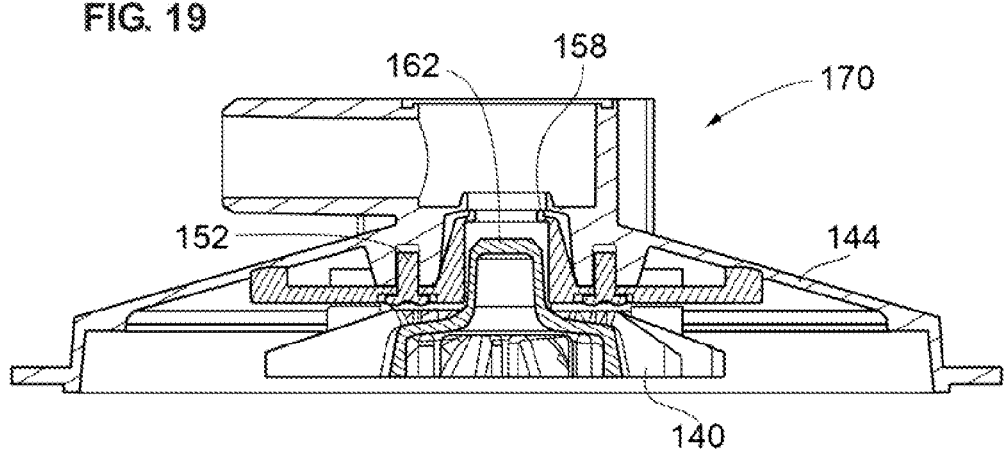
FIG. 19 is a side sectional view of another form of the spray plate that is larger than that of FIG. 18 that is retrofit assembled with another form of a cover larger than that of FIG. 18.
Figure 20:
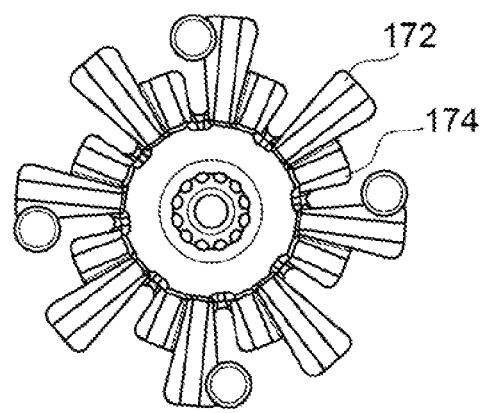
FIG. 20 is a plan view of the spray plate of FIG. 19.

Referring to FIG. 19, another sectional side view of another version 170 of the retrofit spray assembly is shown to more clearly illustrate the configuration after the retrofit operation, in which the same reference numerals used in FIGS. 17 and 18 are used for corresponding parts. As seen in FIG. 20, the spray plate from FIG. 18 a configuration that differs slightly from the versions shown in FIGS. 5 and 6, with eight relatively long pedals 172 and eight relatively short pedals 174 and a core with sixteen vertical channels or grooves 176 that respectively mate with the sixteen pedals 172 and 174. It should also be noted that the dimensions of the adapter 164 are different in the embodiments of FIGS. 17 and 18 to accommodate differently dimensioned housings 144. The different dimensions are due to the spray distribution assemblies being used in brewer with different brewing capacities and thus brew baskets of different sizes.

While several embodiments of the invention has been disclosed in detail, it should be appreciated that many variation may be made without departing from the scope of the invention as defined in the appended claims. For example, while the different versions of the spray plate has been shown with a certain number only four petals 80 in FIG. 5 or eight pedals or sixteen pedals in FIG. 20, it is believed that a similar spray distribution plate with fewer pedals, such as three, could also be successfully employed. Also, while magnetic elements are preferably used to releasably secure the spray distributor member in operative relationship with the spray head for tooless attachment and removal, other means may be used for such tooless, releasable attachment such as the use of frictional mounting tabs or other friction enhancing member to provide a releasable frictional attachment such as shown and described in U.S. provisional patent application 60/474,088 filed May 28, 2004, which is hereby incorporated by reference. Also, for instance, the central hub 58 could be externally threaded to screw into the cylindrical mounting cavity provided with matching internal screw threads or they could be attached by other manually operable fasteners that do no require the use of tools or any other tooless fastening means. Also, while the preferred form of the spray plate has the pedal-like configuration as shown a configuration in which the edge of the plate extends to a circular circumference while the radiating channels terminated in large openings at different radial distances, as shown in the aforementioned provisional patent that is incorporated herein. Reference should therefore be made to the appended claims and obvious functional equivalents of the various elements and features of the invention.

The invention claimed is:

1. A method for use in a hot water spray distribution assembly of a hot beverage brewer to distribute hot water from a hot water dispense system onto ingredient in a brew basket of the brewer, comprising the steps of:

passing hot water from the dispense system to an upright central core having a plurality of grooved passageways extending along an outer surface of the core;

passing hot water through from outlets of the plurality of passageways directly to a top surface portion of an upwardly facing and outwardly and downwardly extending surface of a spray plate attached to the core for receipt and distribution of the hot water to the brew basket, said top surface portion being downwardly and outwardly tapered and in a location relatively central to the spray plate, said spray plate being downwardly and outwardly tapered from said location and extending to its outer periphery, and both said core and said upwardly facing surface being made of hydrophobic, nonmetalic, solid, material, with a heat transfer characteristic that is less than metal; and distributing the hot water across the hydrophobic, nonmetalic, solid material of the upwardly facing and outwardly and downwardly extending surface of the spray plate and off the spray plate onto the ingredient in the brew basket.

2. The method of claim 1 in which the entire spray plate and the attached upright central core are entirely made of the hydrophobic, nonmetalic, solid material.

3. The method of claim 1 in which the nonmetalic material is a polymer.

4. The method of claim 1 in which the nonmetalic material is polypropylene.

5. The method of claim 1 in which
the upwardly facing and outwardly and downwardly extending surface is umbrella-like, and the step of distributing includes the step of
passing the hot water downwardly through the passageways of the core and then directly onto the upward facing surface and to flow outwardly and downwardly along the hydrophobic, nonmetalic, solid, material of the upwardly facing surface and off an outer edge of the spray plate to the ingredient.

6. A method for use in a hot water spray distribution assembly of a hot beverage brewer to distribute hot water from a hot water dispense system onto ingredient in a brew basket of the brewer, comprising the steps of:
passing the hot water through a plurality of passageways formed in part by vertical grooves formed in an upright central core;
passing hot water from outlets of the passageways directly onto a top surface portion of a distribution plate, said top surface portion being downwardly and outwardly tapered and in a location relatively central to the spray plate, said distribution plate being downwardly and outwardly tapered from said location and having an upwardly facing surface for receipt and distribution of hot water to the brew basket, said upwardly facing surface being made of hydrophobic, nonmetalic, solid, material, with a heat transfer characteristic that is less than metal, the hot water passing from the plurality of passageways to a corresponding plurality of upwardly facing grooves in the spray plate surface with surfaces made of hydrophobic, nonmetalic, solid, material that are aligned with the plurality of passageways, respectively; and
distributing the hot water across the hydrophobic, nonmetalic, solid material of the spray plate and off the spray plate onto the ingredient in the brew basket.

7. The method of claim 6 in which the core has an exterior surface that is made of hydrophobic, nonmetalic, solid, material, and including the step of reducing relative to metal the amount of heat transferred to the core by the hot water passing through the passageways.

8. The spray plate of claim 6 in which the entire core is made entirely of hydrophobic, nonmetalic, solid, material.

9. The spray plate of claim 6 in which the central core and the spray plate are integrally molded together as a single piece of solid, hydrophobic, nonmetalic, material.

10. A method of distributing hot water onto a layer of beverage ingredient within a brew basket, comprising the steps of:
forming a plurality of downwardly directed hot water passageways extending from a source of the hot water to a generally laterally, outwardly, downwardly extending top surface of a spray plate by releasably joining together an upstanding central hub of the spray plate with a plurality of outwardly facing, vertical grooves corresponding to the plurality of passageways formed in an outwardly facing surface of the hub with a complementary tubular part connected with the source of the hot water and snuggly fitted over the outwardly facing surface to form at least part of each of the plurality of vertical passageways;
passing hot water from the source to the top surface of the upstanding spray plate through the plurality of passageways;
separating the complementary tubular part from the upstanding central hub to expose the vertical grooves along for purposes of cleaning interiors of the grooves;
cleaning the interiors of the grooves while the upstanding central hub and the vertical grooves are separated;
rejoining the upstanding central huh and the complementary tubular part together to reform the plurality of passageways between the source and the distribution plate; and
passing hot water passed to the water distribution spray plate onto a beverage ingredient within a brew basket along the passageways after being cleaned and reformed.

11. The method of claim 10 in which the top surface of the spray plate is one of (a) convex, tapered downwardly at an increasing taper as the distance from a central location increases, (b) segmented with elongate segments separated by relatively shorter segments that are joined to and between the elongate segments, and (c) formed with upwardly facing grooves that terminate at different radial distances from a central core.

12. The method of claim 10 in which the entire distribution plate is made entirely of hydrophobic, nonmetalic, solid material to reduce the transfer of heat from the hot water to the spray plate relative to metal and to reduce mineral encrustation.

13. The method of claim 10 in which the non material is one of (a) a polymer or polymer-like material, (b) a polypropylene or polypropylene-like material, (c) a plastic or plastic-like material with a heat transfer characteristic substantially smaller than metal, and (d) a plastic or plastic-like material that is hydrophobic.

14. A method of distributing hot water from a hot water dispense system onto ingredient in a brew basket of a hot beverage brewer, comprising the steps of:
rotatably mounting one spray distribution member to another, complementary spray distribution member, and
rotating the one spray distribution member relative to the other spray distribution member to scrape residue off at least one of the one distribution member and the other distribution member, one of the spray distribution members having elongate water-carrying outwardly facing grooves that form hot water passageways when joined to the other spray distribution member, said outwardly facing grooves having outermost edges that scrape residue off the other one of the distribution members during rotation; and
passing hot water onto the ingredient in the brew basket though the passageways formed between the one distribution member and the other distribution member after the residue has been scraped off.

15. A method of distributing hot water onto a layer of beverage ingredient within a brew basket of a hot beverage brewer, comprising the steps of:
filling a water cavity with hot water from a hot water dispensing system;
selectively opening an inlet to a passageway to pass hot water from the water cavity through the passageway;
receiving the hot water directly from an outlet of the passageway directly onto a top surface portion of a distribution plate, said distribution plate being downwardly and outwardly tapered from said location and extending to its outer periphery said distribution plate made from a hydrophobic, nonmetalic, solid, material; and passing the hot water downwardly and outwardly along the top surface to a peripheral edge of the top surface.

16. The method of claim 15 in which the step of passing includes the step of passing the water at a rate adjacent the central portion that is slower than the rate of passing adjacent the peripheral edge.

17. The method of claim 15 in which a core with radially, outwardly facing, peripheral grooves substantially fills the passageway except for gaps between the grooves and an interior surface of the passageway, and the step of receiving the hot water includes receiving the hot water in a circular pattern surrounding a central axis of the passageway.

18. The method of claim 15 including the step of dropping the water off the peripheral edge of the top surface at different radial distances from the central portion.

19. The method of claim 15 in which the top surface has a plurality of radially extending slots of different lengths that in part define the peripheral edge and including the step of passing the water off the peripheral edge at locations along the slots.

20. The method of claim 15 in which the top surface has some slots with inwardly located outlet ends and other slots with outwardly located outlet ends at the peripheral edge portions of the top surface that extend different radial distances from the central portion, and including the step of passing includes the step of passing the water off the outlet ends at different radial distances from the central portion.

21. The method of claim 15 in which the peripheral edge in part forms a plurality of arcuate petal-like members and including the step of passing the water off the peripheral edge at the peripheral edge of the arcuate petal-like members.

22. The method of claim 15 in which the peripheral edge varies inwardly and outwardly from the central portion and including the step of dropping the water off the peripheral edge at a plurality of different radial distances from the central portion.

23. The method of claim 15 in which the top surface has a plurality of upwardly facing elongate radial grooves with outer outlet ends, and the step of receiving includes the steps of receiving the hot water into the radial grooves, and passing the hot water along the grooves to drop the water of the peripheral edge at the outlet ends of the grooves, the outlet ends of said grooves being located at different radial distances from the central portion.

24. The method of claim 15 in which the top surface is made from hydrophobic, nonmetalic, solid, material, and the step of passing includes passing the hot water downwardly and outwardly along the hydrophobic, nonmetalic, solid, material to reduce mineral encrustation and heat absorption by the top surface.

25. A method of distributing hot water from a hot water dispense system onto ingredient in a brew basket of a brewer, comprising:

passing hot water onto a central portion of an upwardly facing surface of an umbrella-like body with an upwardly facing surface made of hydrophobic, nonmetalic, solid, material, with a heat transfer characteristic that is less than metal for receipt and distribution of hot water to the brew basket, said step of passing including the step of passing hot water from the dispense system only down a plurality of passageways formed in an upstanding core joined to the central portion of the umbrella-like body to guide hot water directly to the umbrella-like body for distribution by the body to the brew basket; and allowing the hot water received from an outlet end of the passageways to cascade downwardly and outwardly along the upwardly facing surface and off of distal edges of the umbrella-like body located above the brew basket of the brewer.

26. The water distribution method of claim 25 in which the core and interior surfaces of the core are made entirely of hydrophobic, nonmetalic, solid material.

27. The water distribution method of claim 26 in which the nonmetalic material is a polymer or polymer-like material.

28. The water distribution method of claim 26 in which the nonmetalic material is entirely made of polypropylene or a polypropylene-like material.

* * * * *